Feb. 26, 1952  C. J. GILETTE  2,587,308
TROLLING REEL
Filed Sept. 8, 1947  2 SHEETS—SHEET 1

*INVENTOR.*
CLEMENT J. GILETTE
BY
J S Murray
ATTORNEY

Feb. 26, 1952
C. J. GILETTE
2,587,308
TROLLING REEL
Filed Sept. 8, 1947
2 SHEETS—SHEET 2
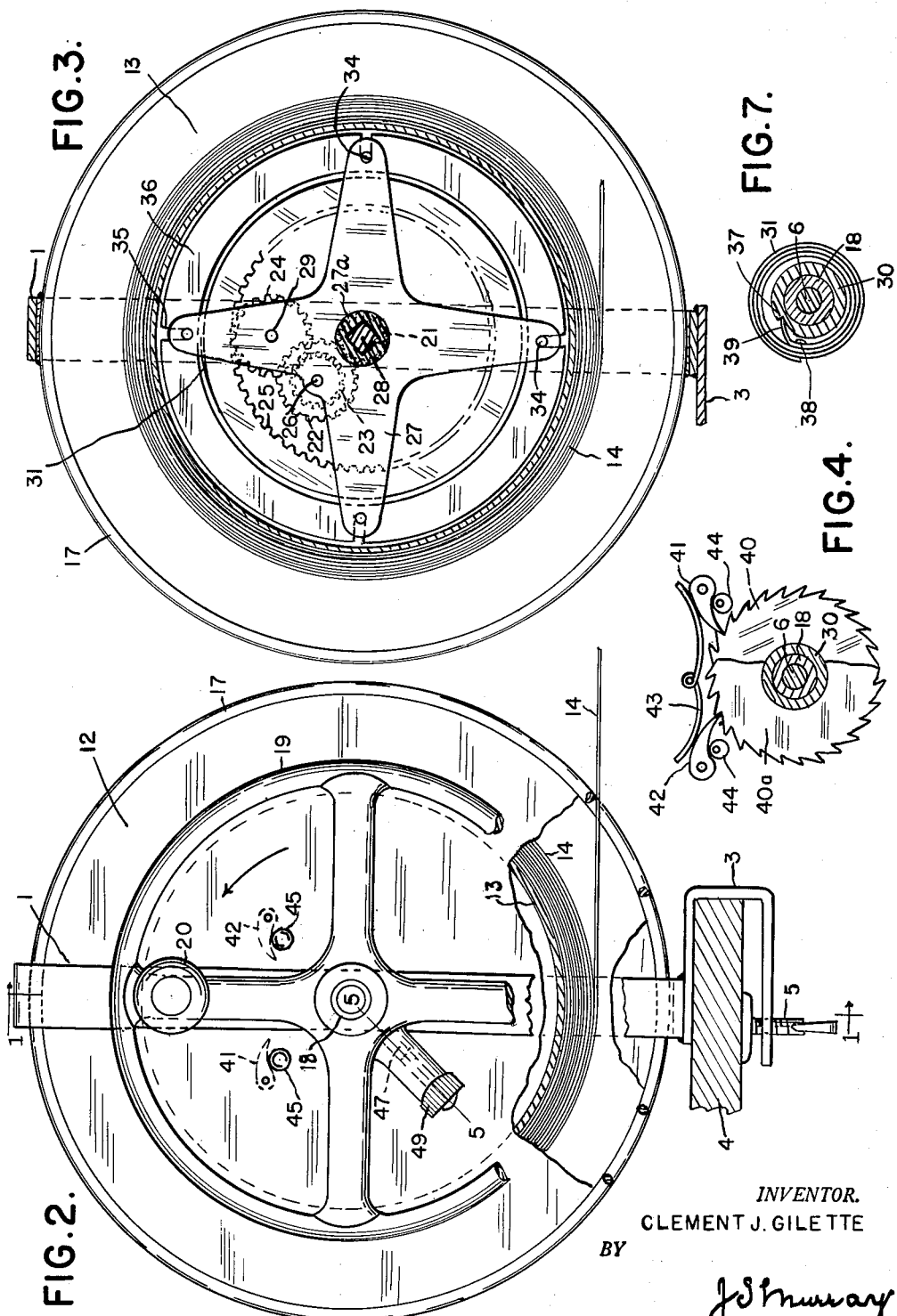
INVENTOR.
CLEMENT J. GILETTE
BY
J.S. Murray
ATTORNEY Patented Feb. 26, 1952

2,587,308

UNITED STATES PATENT OFFICE 2,587,308

TROLLING REEL

Clement J. Gilette, Detroit, Mich.

Application September 8, 1947, Serial No. 772,767

5 Claims. (Cl. 242—108)

1

This invention relates to fishing reels and particularly spring-operated reels.

An object of the invention is to provide for alternatively driving the line-receiving spool of a fishing reel from a spring or by manual means.

Another object is to adapt said spring to be wound either by unreeling the line or by manual means, while the spool is held from rotation.

Another object is to compactly assemble within a hollow line-receiving spool a spring motor for driving such spool and a gear train affording a considerable mechanical advantage in driving the spool.

Another object is to adapt the line spool of a fishing reel to be manually driven through a gear train at an advantageous ratio in reeling in a large fish, or to be rapidly driven independently of the gear train when the line is under moderate tension.

Another object is to provide for an automatic reeling of a fish line, as it is puled in, hand over hand.

These and various other objects are attained by the construction hereinafter described and illustrated in the accompanying drawings, wherein:

Fig. 2 is an end elevational view of the reel, partially in section on the line 2—2 of Fig. 1.

Fig. 3 is a cross sectional view of the reel taken on the line 3—3 of Fig. 1.

Fig. 4 is a fragmentary section taken on the line 4—4 of Fig. 1 and particularly showing certain ratchet and pawl mechanisms.

Fig. 7 is a fragmentary sectional view taken on the line 7—7 of Fig. 1, and showing a ratchet connection between the spool-driving spring and its arbor.

Figures 1, 5, 6:
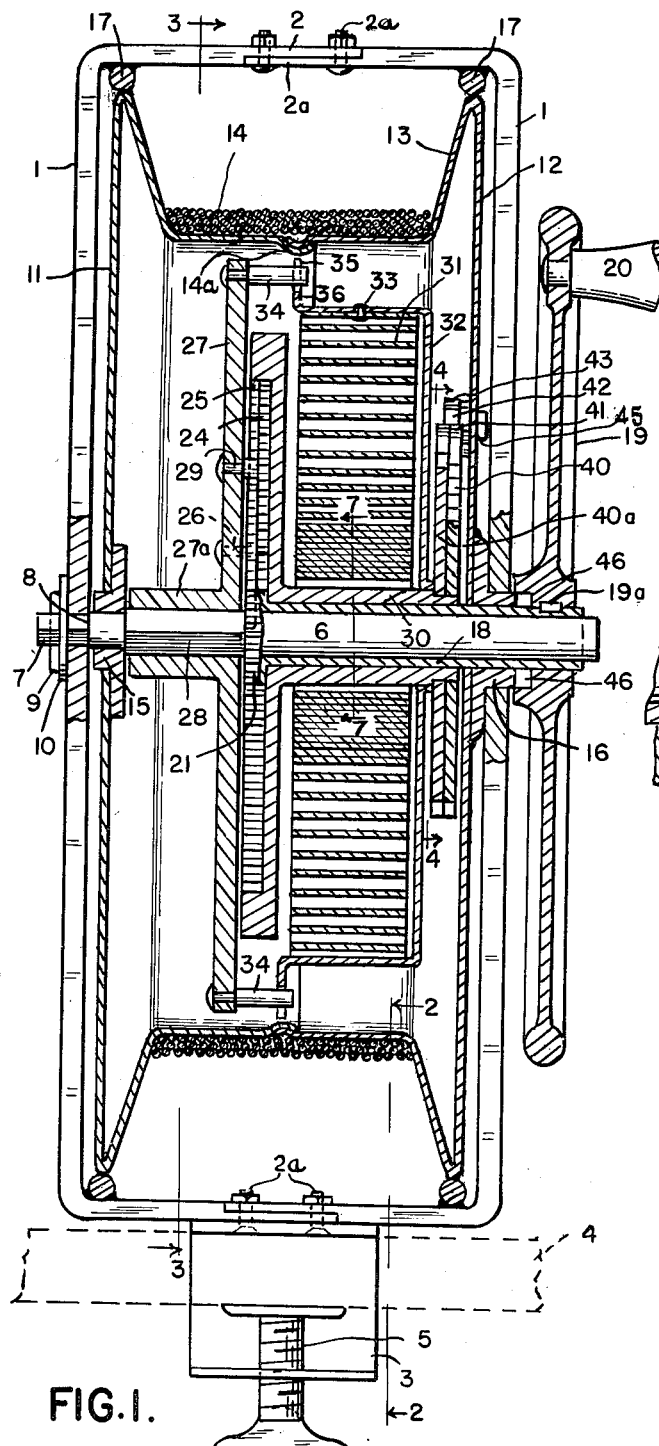
Fig. 1 is a diametrical vertical sectional view of my improved reel, as taken on the line 1—1 of Fig. 2.
Fig. 5 is a sectional detail taken on the line 5—5 of Fig. 2 and showing a sliding pawl in its driving position.
Fig. 6 is a similar view showing the retracted position of such pawl.

In these views, the reference character 1 designates a substantially rectangular open frame, formed preferably by bending two metal bars (which may be of standard stock) to jointly form an elongated rectangular annulus, the ends of such bars meeting in a lapped joint 2, and being bolted together as indicated at 2a at the ends of the annulus, and riveted or otherwise rigidly secured to the lower end of said frame is a U-shaped clamp 3 for straddling one of the seats 4 of a

2 boat (not shown), one arm of such clamp having a clamping screw 5 threaded therein to be stressed upwardly against said seat.

Midway of its length, the frame mounts a shaft 6, an end 7 of which is squared and fitted in a correspondingly shaped opening of the frame, preventing rotation of such shaft. The latter is held from lengthwise movement by forming it with a shoulder 8, interiorly engaging the frame, and by a cotter pin or the like 9 holding a washer 10 exteriorly against the frame. Rotatable on the shaft 6 within the frame and substantially filling the frame opening is a hollow sheet metal spool comprising parallel plates 11 and 12 and an annular channel 13 rigidly carried by and between said plates, a fishing line 14 being adapted to wind in said channel. It is preferred to form the spool in two parts separably joined in the mid plane of the channel. Thus, as best appears in Fig. 1, said halves have annular lapped margins, with indentations 14a entering into a snap engagement, when registered. The plates 11 and 12 respectively carry hubs 15 and 16 for axially journaling the spool. When a considerable length of line is wound on the spool, there may be a tendency for one of more convolutions of the line to laterally escape from the spool and lodge between the spool and a side of the frame. To resist any such tendency, it is preferred to weld a pair of rings 17 to the frame ends, such rings being coaxial with the spool and in close proximity to the junctures of the side walls and channel portion of the spool and preferably slightly overhanging the channel portion.

Journaled on the shaft 6 is a tubular shaft 18, extended exteriorly of the frame 1, at one side of the latter, to rigidly mount a crank wheel 19. As illustrated, the latter is fixed on the shaft 18 by a key 19a and the crank handle of said wheel is designated 20. Within the spool, the shaft 18 terminally and rigidly mounts a pinion 21, forming the driving member of a speed-reducing gear train 21, 22, 23, 24, 25. The gears 22 and 23 rotate as a unit upon a stub shaft 26 set into a plate 27 preferably of spider form, restrained from rotation by engagement of its hub 27a with a squared portion 28 of the shaft 6. The gear 24 is journaled on a stub shaft 29 also fixed in said plate. The gear 25 is of an internal form and has an elongated hub 30 journaled on the shaft 18 and serving as a winding arbor for a clock type spring 31. Said spring occupies a sheet metal housing 32, it outer end having a suitable rigid connection to the peripheral wall of said housing, as indicated at 33. To restrain said housing from rotation, pins 34 fixed on the outer ends of the arms of the spider plate 27, are extended into notches 35 formed in a flange 36 annularly projecting outwardly from the housing periphery. It is preferred to employ a ratchet connection between the spring and the arbor 30, so that actuation of the arbor in a non-winding direction will put no strain on the spring and will produce a clicking such as will indicate that the spring is not being wound. To secure this effect a notch 37 is formed in the arbor 30, as best appears in Fig. 7, and the inner end portion of the spring forms a collar 38 somewhat larger than the arbor, the inner extremity 39 of the spring projecting resiliently into the collar for ratchet engagement with the notch 37.

Between the housing 32 and the side plate 12 of the spool, two reversely toothed ratchet wheels 40 and 40a (see Fig. 4) are terminally fixed on the arbor 30 and are respectively engageable by pawls 41 and 42 interiorly pivoted on the plate 12 and urged toward said ratchet wheel by a light spring 43. Each pawl may be held clear of the ratchet wheel by a cam member 44 beneath such pawl, rigidly carried by a pin rotative in the plate 12 and having a button head 45 exteriorly of such plate, whereby the cam member may be rotated to disengage its pawl from the corresponding ratchet wheel.

The hub 16 of the spool extends through the adjacent member of the frame 1 and is formed with one or more apertures 46 exteriorly of the frame for selective engagement by a pawl 47 having the form of an elongated pin radially slidable in the hub portion of the crank wheel 19. A spring 48 coiled in said hub portion urges the pawl 47 inward and a head 49 rotatable on the outer end of said pawl serves to maintain a released position of such pawl when desired. To exercise this function said head and a seat for such head formed on the crank wheel have cam faces diagonally divergent to the length of the sliding pawl, so that the pawl may respond to the spring 48 when rotation of the head establishes said cam faces in parallelism (Fig. 5), while the pawl is retracted when said cam faces are divergently interengaged, as in Fig. 6.

In use of the described reel, the spring 31 serves to drive the spool in a direction to wind up the line as it is drawn in, hand over hand, by a fisherman, this being particularly desirable in trolling. When the line, with attached sinker, is trailing behind a boat, the strength of the spring is inadequate to draw in the line, but when the latter is slackened by pulling it manually in, the torque applied to the spool by the spring is ample to continuously take up such slack. Assuming the spring to be unwound or substantially unwound, when the line is fully spooled, winding of the spring 31 on its arbor will be effected by running out the line from the reel, as by hand over hand pulling. In using the reel as described, the pawl 47 must engage the hub 16 of the spool, while the pawls 41 and 42 will be retracted. Thus the crank wheel transmits a drive from the spool to the shaft 18 which, in turn, acts through the gear train to drive the arbor 30 and wind the spring, the arbor being driven much slower than the shaft 18.

The spring may also be wound on its arbor by turning the crank wheel in the proper direction, indicated by the arrow in Fig. 2. In this operation, the arbor 30 is driven from the shaft 18 through the speed reduction train 21, 22, 23, 24, 25, the total number of crank wheel revolutions being sufficient to entail a quite moderate application of force. Preferably all three pawls 41, 42, and 47 will be retracted during the described operation, thus avoiding any delivery of power to the reel. The only occasion, however, for employing the crank wheel to wind the spring is in initially applying a line to the reel, the wound spring then rapidly and easily spooling the line. When the pawl 42 is engaged with the corresponding ratchet wheel, any unwinding of the spring may be prevented by tying or otherwise securing the line 14 to the frame 1.

In pulling in fish that impose no heavy strain on the line, the fisherman may bring in the line, hand over hand, as has been already described. If a hooked fish is of a size or type to stress the line considerably, while not applying severe stresses, it is preferred to use the crank wheel to reel in and play the fish. In thus using the reel, the sliding pawl 47 is engaged with the hub 16 so that the crankwheel and spool will turn in unison, the mechanical advantage derived being merely the leverage afforded by the wheel. The pawls 41 and 42 will be retracted, and the spring will be unwound, through the gear train, as the fish is brought in or will be wound, if the fish is given line.

In pulling in fish that heavily strain the line, the crank wheel is used, with the pawls 41 and 42 engaged and the pawl 47 retracted. Under these conditions the spool is driven through the gear train, which affords a powerful mechanical advantage, as for example, twelve to one. The fish may be played, as desired, being drawn in by clockwise rotation (with reference to Fig. 2) of the crank wheel and given additional line by counter clockwise rotation of said wheel. The spring 31 is wound or unwound, according to the direction of crankwheel rotation, without materially effecting the described operation.

When for any reason, access to the mechanism enclosed by the spool becomes necessary, the two halves of the frame 1 are disconnected by removal of the bolts 2a, and upon removal of the cotter pin 9 the shaft 6 may be withdrawn from the assembly. The halves of the spool may then be separated.

While the improved reel has been described as attachable by the clamp 3, 5 to the seat of a boat, it may be carried in a well-known manner by the butt of a fishing rod, or otherwise suitably supported.

What I claim is:

1. A fishing reel comprising a hollow rotatable spool, a frame having an opening receiving said spool, a shaft fixedly carried by said frame at the spool axis, a tubular shaft journaled on said fixed shaft, a drive spring for the spool, coiled within the spool, a tubular arbor for said spring journaled on said tubular shaft, a gear train establishing a drive connection from the arbor to the tubular shaft and multiplying the tubular shaft speed with relation to that of the arbor, an anchorage means for the outer end of the spring fixed upon said fixed shaft within the spool, and a drive connection from said tubular shaft to the spool.

2. In a fishing reel as set forth in claim 1, said tubular shaft having an end portion projecting exteriorly of the frame, a crank member in driving engagement with said end portion and forming the last-mentioned drive connection.

3. A fishing reel comprising a spool, a shaft coaxial with said spool, a spring for driving said spool, an arbor for said spring coaxial with the spool, a gear train establishing a drive connection from the arbor to the shaft, multiplying the angular speed of the shaft with relation to that of the arbor, a releasable drive connection from the spool to the arbor, and a releasable connection between the shaft and spool, whereby they may rotate as a unit.

4. A fishing reel comprising a fixed shaft and a coaxial rotative shaft, a hollow spool rotatable about the axis of said shafts, a drive spring for said spool coiled within the spool, a tubular arbor for said spring coaxial with the spool, a gear train establishing a drive from the arbor to said rotative shaft and multiplying the angular speed of the rotative shaft with relation to that of the arbor, a releasable drive connection from the rotative shaft to the spool, an anchorage member fixed upon the fixed shaft within the spool, means for anchoring the outer end of said spring to said member, and means for journaling at least one gear of said train on said member.

5. A fishing reel comprising a hollow spool, a frame having an opening receiving the spool, a shaft journaled in said frame at the spool axis, a drive spring for the spool coiled within the spool, an arbor coaxial with said shaft and operatively engaged by the inner end of said spring, anchorage means for the outer end of said spring, a gear train establishing a drive connection from the arbor to said shaft and multiplying the shaft speed with relation to that of the arbor, a crank member fixed on said shaft in an exterior relation to said frame, and means for establishing a releasable drive connection from the crank member to the spool.

CLEMENT J. GILETTE.

REFERENCES CITED

The following references are of record in the file of this patent:

UNITED STATES PATENTS

| Number | Name | Date |
| --- | --- | --- |
| 551,645 | Newell | Dec. 17, 1895 |
| 743,856 | Funk | Nov. 10, 1903 |
| 975,587 | Wadham | Nov. 15, 1910 |
| 1,855,738 | Case | Apr. 26, 1932 |
| 2,269,808 | Cabassa | Jan. 13, 1942 |